United States Patent
Lee et al.

(10) Patent No.: US 7,357,519 B2
(45) Date of Patent: Apr. 15, 2008

(54) OPTICAL PROJECTION DEVICE

(75) Inventors: Sea-Huang Lee, Miao-Li County (TW); Shou-Chih Cheng, Miao-Li County (TW)

(73) Assignee: Corentronic Corporation, Miao-Li County (TW)

( * ) Notice: Subject to any disclaimer, the term of this patent is extended or adjusted under 35 U.S.C. 154(b) by 150 days.

(21) Appl. No.: 11/215,893

(22) Filed: Aug. 30, 2005

(65) Prior Publication Data
US 2006/0126034 A1    Jun. 15, 2006

(30) Foreign Application Priority Data
Dec. 10, 2004   (TW)   ................ 93138331 A

(51) Int. Cl.
G03B 21/22    (2006.01)
G03B 21/26    (2006.01)
G03B 21/28    (2006.01)
G02F 1/1335   (2006.01)
H04N 5/74     (2006.01)
G02B 23/16    (2006.01)
G02B 7/02     (2006.01)

(52) U.S. Cl. ............ 353/119; 353/37; 353/99; 348/759; 348/771; 349/5; 359/513; 359/811

(58) Field of Classification Search ............ 353/119, 353/30, 31, 34, 37, 52, 56, 81, 98, 99, 122; 348/739, 744, 750, 758, 759, 771; 349/5, 349/7, 8; 359/507, 511–513, 618, 642, 811, 359/819, 820
See application file for complete search history.

(56) References Cited

U.S. PATENT DOCUMENTS

| | | | |
|---|---|---|---|
| 3,820,682 A * | 6/1974 | Davella | 220/315 |
| 6,416,184 B1 * | 7/2002 | Arai et al. | 353/52 |
| 6,513,936 B1 * | 2/2003 | Ishiwa et al. | 353/56 |
| 6,568,813 B1 * | 5/2003 | Haba et al. | 353/57 |
| 7,090,360 B2 * | 8/2006 | Kuroda et al. | 353/119 |
| 7,165,848 B2 * | 1/2007 | Gishi | 353/88 |
| 2002/0196556 A1 * | 12/2002 | Hirata et al. | 359/649 |

\* cited by examiner

*Primary Examiner*—Rochelle Blackman
(74) *Attorney, Agent, or Firm*—J.C. Patents

(57) ABSTRACT

An optical projection device including a light source, a housing, an imaging unit, a projection lens and a dust protection device is provided. The light source is adopted for providing a light beam. The housing has a projection-lens-assembling opening. The imaging unit is disposed in the housing, and on the transmission path of the light beam. In addition, the projection lens in the housing, and exposed by the projection-lens-assembling opening. The dust protection device is disposed between the projection lens and the projection-lens-assembling opening. The optical projection device is thus protected from dust and displaying quality thereof is excellent.

9 Claims, 5 Drawing Sheets

US 7,357,519 B2

OPTICAL PROJECTION DEVICE

CROSS-REFERENCE TO RELATED APPLICATION

This application claims the priority benefit of Taiwan application serial no. 93138331, filed on Dec. 10, 2004. All disclosure of the Taiwan application is incorporated herein by reference.

BACKGROUND OF THE INVENTION

1. Field of the Invention

The present invention relates to an optical projection device. More particularly, the present invention relates to a dust protection device for the optical projection device.

2. Description of Related Art

In general, conventional optical projection device is mainly constructed by light source, imaging unit and projection lens. The imaging unit includes a non-direct view display device such as silicon-based liquid crystal panel, high temperature polycrystalline silicon liquid crystal panel or digital micromirror device (DMD), and an optical lens set constructed by reflection mirrors and lens. The light source is adopted for providing a light beam into the imaging unit. The optical lens set is adopted for transmitting the light beam into the display device. The display device receives the light beam and generates an image, and then the image is transmitted to the projection lens via the optical mirror set. Finally, the image is projected to a projection screen by the projection lens.

In general, the resolution of the display device optical projection device has high resolution. The higher image quality of the projected and the enlarged image can be achieved. However, it is noted that the image is enlarged several times in the optical projection device. Therefore, if the display device or the optical lens set is covered with dust or other contaminations, the display device is damaged. In addition, the interference due to the dust or the contaminations is also simultaneously enlarged with the image during being projected to the projection screen. Therefore, the quality of the image displayed is adversely affected.

Accordingly, a dust protection device is developed for the internal optical lens set and the display device in a conventional optical projection device. FIG. 1A is a perspective view of a conventional optical projection device. FIG. 1B is a top view of the optical projection device shown in FIG. 1A. It is noted that, parts of the housings are shown in FIG. 1B. Referring to FIG. 1B, the projection lens 130 is mounted on the housing 110. The terminal of the projection lens 130 is connected to a barrel (not shown), thus the terminal of the projection lens 130 cannot be lengthened or shortened. A DMD 122 and an optical lens set are installed in the housing 110, wherein the optical lens set generally includes a relay lens 124 and other optical lens (not shown). Generally, in order to protect the DMD 122 from the dust or the contaminants, conventionally the relay lens 124 is installed outside of the DMD 122 and over the projection lens 130. Therefore, the DMD 122 is surrounded and sealed by the relay lens 124 and the barrel for mounting, so that the DMD 122 is protected from dust.

However, as the demand of the display quality and the magnifying power of the image increase gradually, the size of the projection lens is also increased. For this reason, the optical path among the projection lens is also lengthened. Therefore, the terminal of the projection lens cannot be mounted in the barrel, and thus the relay lens and barrel cannot be sealed from the dust. In summary, the conventional optical projection device cannot be adopted for high magnification projection lens. In addition, the conventional dust protection mechanism has to be modified corresponding to the development of optical system.

SUMMARY OF THE INVENTION

The present invention provides a dust protection device for an optical projection device.

According to one embodiment of the present invention, an optical projection device including a light source, a housing, an imaging unit, a projection lens and a dust protection device is provided. The light source is adopted for providing a light beam. The housing has a projection-lens-assembling opening. The imaging unit is disposed in the housing, and on the transmission path of the light beam. In addition, the projection lens in the housing, and exposed by the projection-lens-assembling opening. The dust protection device is disposed between the projection lens and the projection-lens-assembling opening. The optical projection device is thus protected from dust and displaying quality thereof is excellent.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention now will be described more fully hereinafter with reference to the accompanying drawings, in which embodiments of the invention are shown. This invention could, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1A:
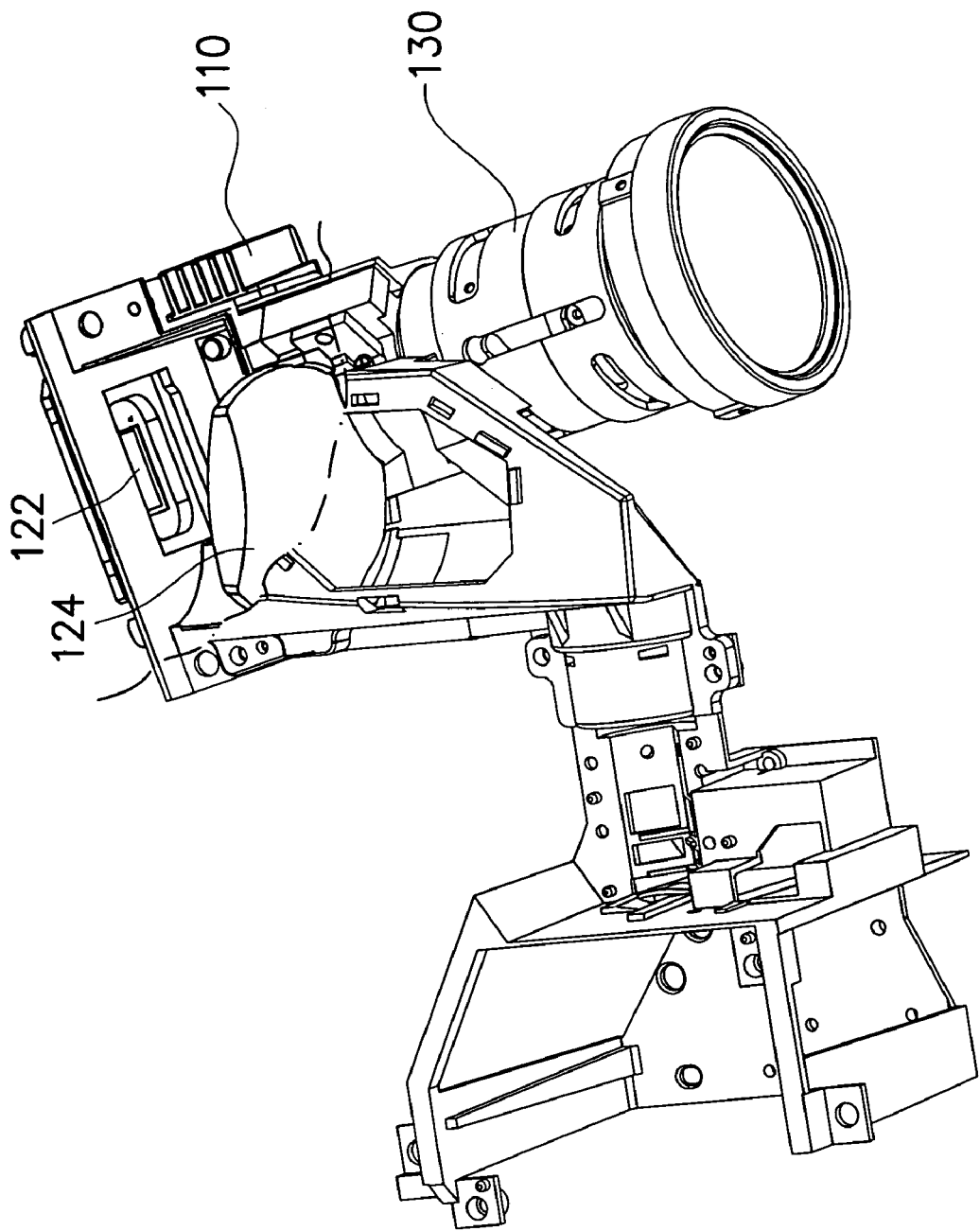
FIG. 1A is a perspective view of a conventional optical projection device.
Figure 1B:
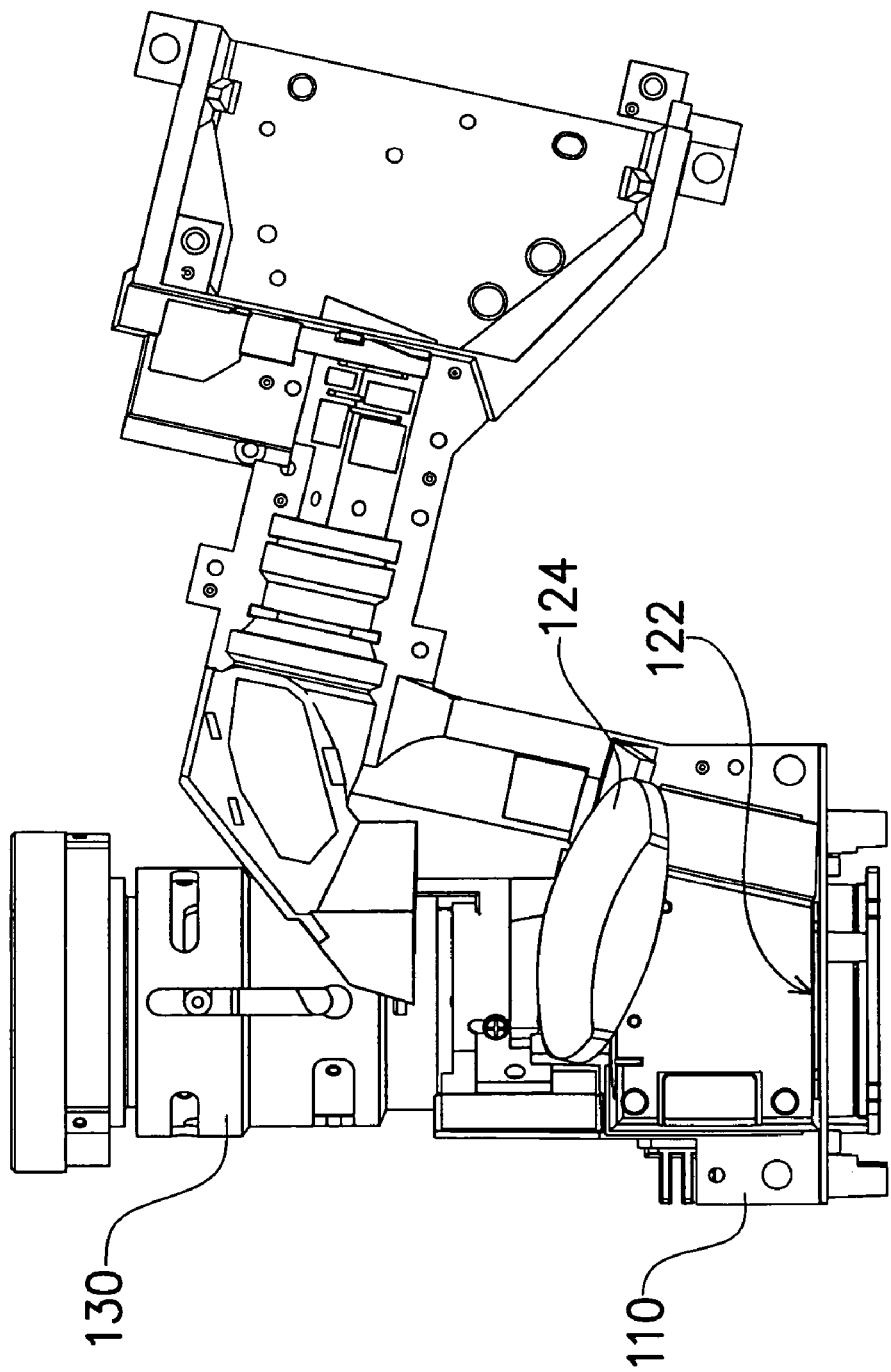
FIG. 1B is a top view of the optical projection device shown in FIG. 1A.
Figure 2A:
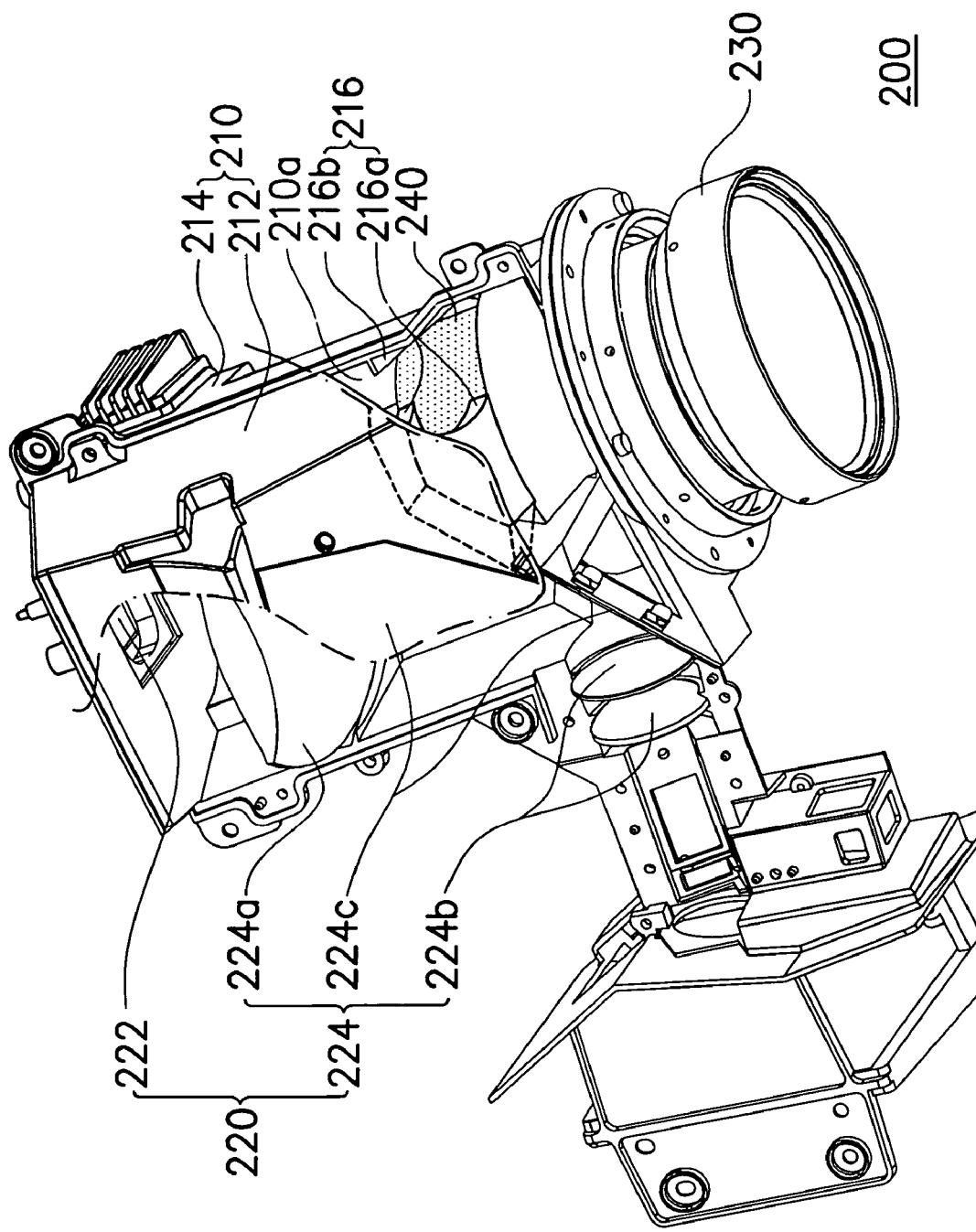
FIG. 2A is a perspective view of an optical projection device according to one embodiment of the present invention.
Figure 2B:
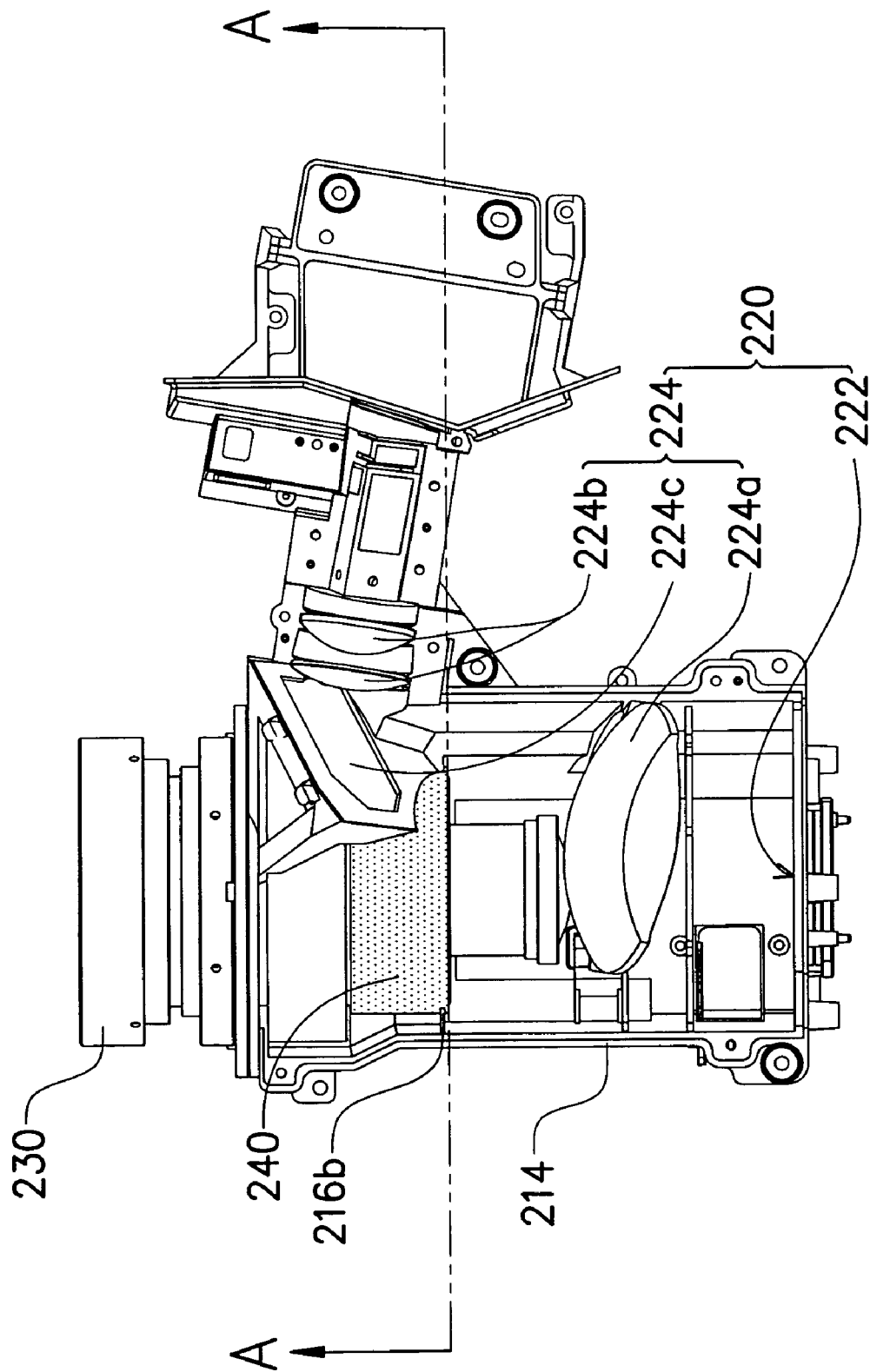
FIG. 2B is a top view of the optical projection device shown in FIG. 2A.
Figure 2C:
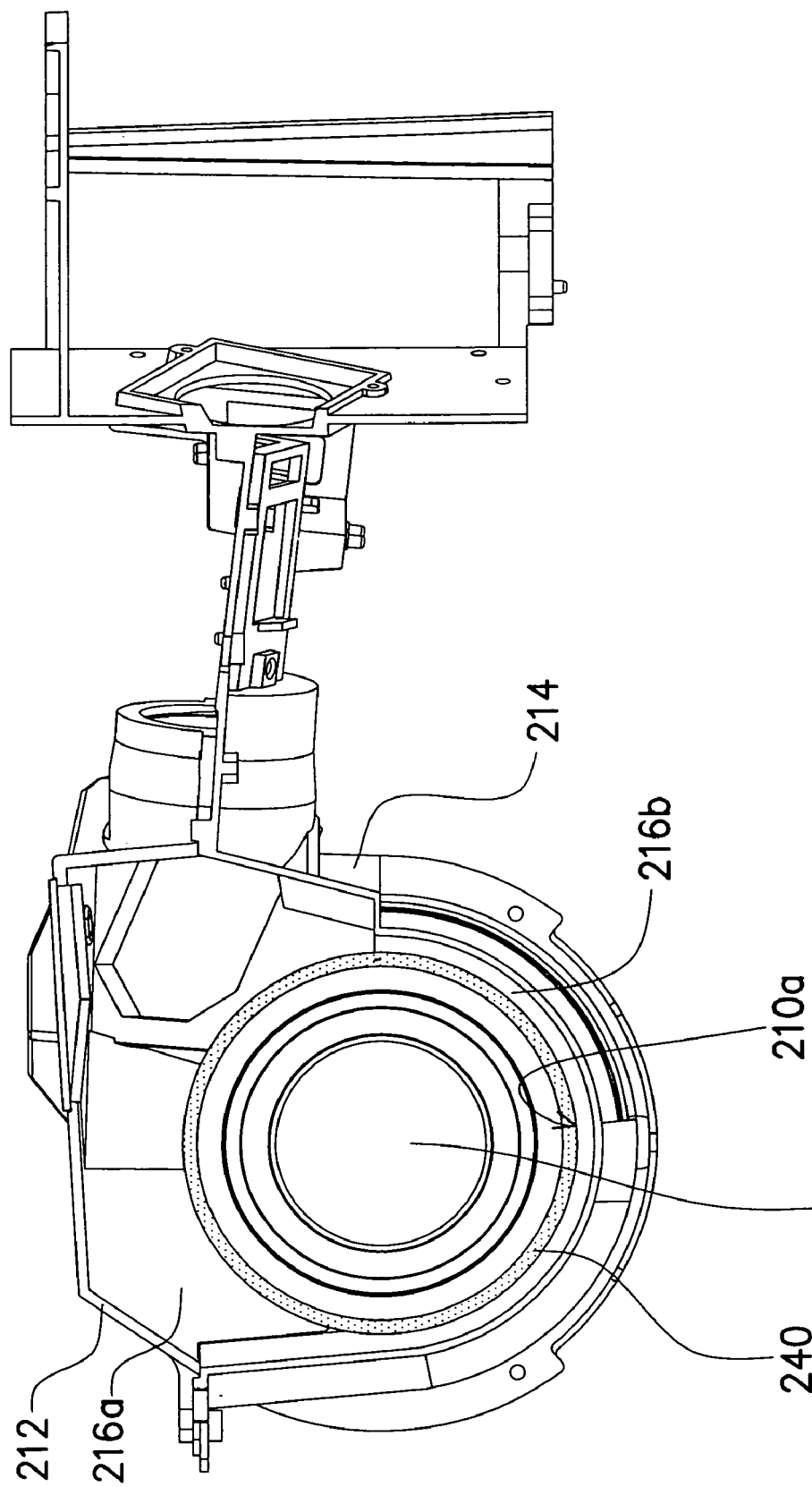
FIG. 2C is a cross-sectional view of FIG. 2B along line A-A'.

FIG. 2A is a perspective view of an optical projection device according to one embodiment of the present invention. FIG. 2B is a top view of the optical projection device shown in FIG. 2A, wherein the second shell of the housing is not shown. FIG. 2C is a cross-sectional view of FIG. 2B along line A-A'. Referring to FIGS. 2A to 2C, an optical projection device 200 comprises, for example, a housing 210, an imaging unit 220, a projection lens 230, a dust protection device 240 and a light source (not shown). The imaging unit 220 is disposed in the housing 210, and the imaging unit 220 comprises a display device 222 and an optical lens set 224. In one embodiment of the present invention, the display device 222 comprises a non-direct view display device such as a silicon-based liquid crystal panel, a high temperature polycrystalline silicon liquid crystal panel or a digital micromirror device (DMD). The optical lens set 224 comprises optical mirror or lens sheet such as relay lens 224a, collector lens 224b, and/or reflection mirror 224c.

Referring to FIGS. 2A to 2C, the housing 210 comprises, a first shell 212 having, for example, a first rib 216a disposed thereon and a second shell 214 having, for example, a second rib disposed thereon. The first shell 212 is assembled with the second shell 214 such that the first rib 216a is assembled with second rib 216b to form the projection-lens-assembling opening 210a. Thus, the first rib 216a and the second rib 216b are assembled to construct a rounded rib 216 to define the projection-lens-assembling opening 210a.

Referring to FIGS. 2A to 2C, the projection lens 230 is assembled within the projection-lens-assembling opening 210a of the housing 210 and is exposed by the projection-lens-assembling opening 210a. The rounded rib 216 constructed by the first rib 216a on the first shell 212 and the second rib 216b on the second shell 214 surrounds the boundary of the projection lens 230. In one embodiment of the present invention, according to the design of the system and the requirement of the application, for example, almost all the projection lens 230 is extended out from the housing 210, or almost all the projection lens 230 is confined within the housing 210. Therefore, the adjustable length for lengthening or shortening the projection lens may be increased. In addition, the light beam (not shown) emitted by the light source (not shown) sequentially passes the collector lens 224b, the reflection mirror 224c and the relay lens 224a to the display device 220 to form an image on the display device 220. Then the image passes the relay lens 224a and then projects via the projection lens 230.

As shown in FIGS. 2A to 2C, in one embodiment of the present invention, the dust protection device 240, which is disposed between the projection-lens-assembling opening 210a and the projection lens 230, is in the housing 210 for protecting the imaging unit 220 of the display device 222 and the optical lens set 224 disposed in the housing 210 from dust. Wherein, the material of the dust protection device 240 comprises, for example, rubber material or foaming material. The dust protection device 240 is positioned surrounding the projection lens 230 corresponding to the projection-lens-assembling opening 210a. When the projection lens 230 is assembled with housing 210, the dust protection device 240 leans against the rounded rib 216 on the housing 210. Therefore, the interior of the housing 210 is sealed by the combination of the dust protection device 240 and the rounded rib 216 on the housing 210. In this way, the display device 222 and the optical lens set 224 disposed in the housing 210 can be effectively protected from dust.

It is noted that, in one embodiment of the present invention, the length of the second rib 216b is three times the length of the first rib 216a. In other words, the second rib 216b disposed on the second shell 212 constitute ¾th circumference of the projection lens 230 and, the first rib 216a disposed on the first shell 214 constitute the remaining ¼th circumference of the projection lens 230. Hence, a stable mounting can be achieved. In addition, in another embodiment of the present invention, the lengths of the first rib 216a and the second rib 216b could be the same or different according to the design or the requirements.

Referring to FIGS. 2A to 2C, the projection lens 230 is assembled within the projection-lens-assembling opening 210a of the housing 210 and is exposed by the projection-lens-assembling opening 210a. The rounded rib 216 constructed by the first rib 216a on the first shell 212 and the second rib 216b on the second shell 214 surrounds the boundary of the projection lens 230. In one embodiment of the present invention, according to the design of the system and the requirement of the application, for example, almost all the projection lens 230 is extended out from the housing 210, or almost all the projection lens 230 is confined within the housing 210. Therefore, the adjustable length for lengthening or shortening the projection lens may be increased. In addition, the light beam (not shown) emitted by the light source (not shown) sequentially passes the collector lens 224b, the reflection mirror 224c and the relay lens 224a to the display device 222 to form an image on the display, device 222. Then the image passes the relay lens 224a and then projects via the projection lens 230.

The foregoing description of the embodiment of the present invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. It should be appreciated that variations may be made in the embodiments described by persons skilled in the art without departing from the scope of the present invention as defined by the following claims. Moreover, no element and component in the present disclosure intends to be dedicated to the public regardless of whether the element or component is explicitly recited in the following claims.

What is claimed is:

1. An optical projection device, comprising:
   a light source for providing a light beam;
   a housing comprising a projection-lens-assembling opening, wherein the housing comprises:
      a first shell comprising a first rib disposed thereon;
      a second shell comprising a second rib disposed thereon, assembled with the first shell such that the first rib and the second rib are assembled to form a rounded rib surrounding the projection-lens-assembling opening, wherein a length of the first rib and a length of the second rib are different;
   an imaging unit disposed in the housing and on a transmission path of the light beam;
   a projection lens assembled in the projection-lens-assembling opening of the housing and exposed by the projection-lens-assembling opening; and
   a dust protection device disposed in the housing for protecting the imaging unit and between the projection lens and the projection-lens-assembling opening.

2. The optical projection device of claim 1, wherein the length of the second rib is three times the length of the first rib.

3. The optical projection device of claim 1, wherein the imaging unit comprises:
   a display device; and
   an optical lens set, disposed between the light source and the display device, and between the display device and the projection lens.

4. The optical projection device of claim 3, wherein the display device comprises a digital micromirror device (DMD), a silicon-based liquid crystal panel or a high temperature polycrystalline silicon liquid crystal panel.

5. The optical projection device of claim 3, wherein the length of the second rib is three times the length of the first rib.

6. The optical projection device of claim 3, wherein a material of the dust protection device comprises rubber.

7. The optical projection device of claim 3, wherein a material of the dust protection device comprises foaming material.

8. The optical projection device of claim 1, wherein a material of the dust protection device comprises rubber.

9. The optical projection device of claim 1, wherein a material of the dust protection device comprises foaming material.

* * * * *